Patented Apr. 30, 1940

2,198,884

UNITED STATES PATENT OFFICE 2,198,884

PROCESS OF INTRODUCING DOUBLE BONDS INTO ALIPHATIC COMPOUNDS

Kurt A. F. Pelikan, Jersey City, Erich F. R. Schuelke, North Bergen, and Donatus von Mikusch-Buchberg, East Orange, N. J., assignors to Woburn Degreasing Company, Harrison, N. J., a corporation of New Jersey No Drawing. Application January 16, 1937, Serial No. 120,878

7 Claims. (Cl. 260—398)

This invention relates to the process of introducing double bonds into an aliphatic chain by heating a sulfonation product of certain aliphatic compounds in which the hydrogen atom of the —$SO_3H$ group has been neutralized by alkali, such as either sodium or potassium or ammonium.

The invention is particularly useful in connection with the treatment of sulfonated glyceryl ricinoleate, but is also applicable to many other sulfonated aliphatic compounds.

In carrying out this invention the group H—$O.SO_3$.X (where X stands for alkali) is removed from alkali sulfonates, such as sulfonated hydroxy oils, acids and other aliphatic compounds to which alkali has been added. This may be done at temperatures ranging from about 150° C. to about 300° C., at which the group resulting from treatment with sulphuric acid is split off. The alkali sulphonate can be prepared in such a way, that after sulfonation of the organic compound enough alkali is added to neutralize 1 hydrogen of the combined sulphuric acid present. In certain cases it is desirable to have free sulphuric acid present after sulfonation has taken place. In such cases enough alkali is added to half neutralize the free sulphuric acid present.

Our investigations show that, after sulfonation and neutralization of certain esters have taken place in accordance with this invention, a new double bond is formed by heating the product.

We have found that this invention is well adapted for treating compounds which already contain hydroxy groups, such as glycerides of oxy palmitic acids, oxy stearic acids, di-oxy stearic acids, etc. The sulfonation of such esters may be advantageously carried out by treating them with about 5% or less of sulphuric acid after which the resulting product is neutralized with alkali to neutralize one hydrogen of the sulphuric acid that is used, or a slight excess over this amount of alkali may be applied. That is to say, enough alkali should be used to neutralize all of the organically combined $SO_3$ and half of the hydrogen of the sulphuric acid that is not reacted. The excess water should be removed either before or while heating takes place and the neutralization products should be heated at temperatures between about 150 and 300° C. Reduced pressure may be applied and stirring should be provided either mechanically or by inert gases and vapors, or by steam.

The following specific examples are given illustrating the invention, but it is to be understood that the materials, as well as the proportions, times and temperatures may be varied over considerable ranges:

Example I.—100 parts of commercial waste Turkey red oil were adjusted to a point slightly to the basic side of the "Congo point." After evaporating the water under vacuum the substance was heated and kept between 200 and 210° C. under vacuum for 30 minutes while stirring with nitrogen. The resulting product had an iodine number of 129 (Hanus 1 hour).

Example II.—1000 parts by weight of castor oil were sulfonated with 21.6 parts of 95% sulphuric acid at a temperature between 20 and 30° C. for about 20 minutes. A 50% aqueous solution of 8.4 parts of sodium hydroxide were then slowly added. The reaction products were then heated to between 150 and 200° C. for about 30 minutes while being agitated with superheated steam, during which time a vacuum was maintained below 30 mm. absolute pressure. The final product had an acid number of 3.1 and an iodine number of 145.5 (Hanus 1 hour).

Example III.—1000 parts by weight of castor oil were sulfonated with 25 parts of 95% sulphuric acid at a temperature between 20 and 30° C. and then the mixture was allowed to stand, the whole procedure lasting 40 minutes. 14.5 parts by weight of potassium hydroxide dissolved in an equal weight of water were slowly added in another 20 minutes. The resulting colloidal mixture was heated to 200–210° C. in a vacuum maintained below 13 mm. absolute pressure while agitating with nitrogen. The reaction was completed in about 30 minutes, as was shown by substantial cessation of foaming. Heating was then continued for about another hour until approximately molecular proportions of water were distilled off. The reaction products were cooled down while excluding air by passing a current of nitrogen through them, whereupon a light colored oil was obtained having an acid number of 3 and an iodine number of 142.5 (Hanus 1 hour).

We claim:

1. The process which comprises selecting a substituted sulfuric acid produced by reacting said acid with an ester of a hydroxy fatty acid having a chain of carbon atoms of the order of 16 to 18, neutralizing said substituted sulfuric acid with an alkali and then heating the neutralized acid to temperatures of the approximate range of 150° C. to 300° C. whereby mono alkali sulfate is split off.

2. The process which comprises selecting a substituted sulfuric acid produced by reacting said acid with an ester of a hydroxy higher fatty acid, neutralizing said substituted sulfuric acid with an alkali and then heating the neutralized acid to temperatures of the approximate range of 150° C. to 300° C. whereby mono alkali sulfate is split off.

3. The process which comprises treating an ester of a hydroxy fatty acid with a sulfonating reagent insufficient to effect complete sulfonation whereby a predetermined proportion of a substituted sulfuric acid is produced dissolved in a substantially larger proportion of unreacted ester, neutralizing said substituted sulfuric acid with an alkali, and thereafter heating the product whereby a catalytic reaction takes place accompanied by splitting off of the elements of water.

4. The process which comprises reacting sulfuric acid with a hydroxy compound selected from the group consisting of higher hydroxy fatty acids and esters of said acids whereby a substituted sulfuric acid is obtained; neutralizing said substituted sulfuric acid with an alkali and heating the neutralized product to temperatures of the approximate range of 150° C. to 300° C.

5. The process which comprises reacting sulfuric acid with a glycerol ester of ricinoleic acid whereby a substituted sulfuric acid is obtained; neutralizing said substituted sulfuric acid with an alkali and heating the neutralized product to temperatures of the approximate range of 150° C. to 300° C.

6. The process which comprises reacting sulfuric acid with a hydroxy compound selected from the group consisting of higher hydroxy fatty acids and esters of said acids whereby a substituted sulfuric acid is obtained; neutralizing said substituted sulfuric acid with an alkali and heating the neutralized product to temperatures of the approximate range of 150° C. to 300° C. under reduced pressure.

7. The process which comprises reacting sulfuric acid with a hydroxy compound selected from the group consisting of higher hydroxy fatty acids and esters of said acids whereby a substituted sulfuric acid is obtained; neutralizing said substituted sulfuric acid with an alkali and heating the neutralized product to temperatures of the approximate range of 150° C. to 300° C. under reduced pressure and in an inert atmosphere.

KURT A. F. PELIKAN.
ERICH F. R. SCHUELKE.
DONATUS von MIKUSCH-BUCHBERG.